US008533211B2

(12) United States Patent
Dasgupta et al.

(10) Patent No.: US 8,533,211 B2
(45) Date of Patent: *Sep. 10, 2013

(54) INFORMATION EXTRACTION ACROSS MULTIPLE EXPERTISE-SPECIFIC SUBJECT AREAS

(75) Inventors: Sajib Dasgupta, College Park, MD (US); Dipayan Gangopadhyay, San Jose, CA (US); Norman J. Pass, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,949

(22) Filed: May 24, 2012

(65) Prior Publication Data

US 2012/0232887 A1 Sep. 13, 2012

Related U.S. Application Data

(63) Continuation of application No. 12/329,804, filed on Dec. 8, 2008, now Pat. No. 8,266,164.

(51) Int. Cl.
*G06F 17/30* (2006.01)
(52) U.S. Cl.
USPC ........................................................ 707/756
(58) Field of Classification Search
USPC .................... 707/759, 749, 999.004, 999.001
See application file for complete search history.

(56) References Cited

U.S. PATENT DOCUMENTS

| 6,327,593 | B1 | 12/2001 | Goiffon |
| 6,996,572 | B1* | 2/2006 | Chakrabarti et al. ......... 715/205 |
| 7,283,949 | B2* | 10/2007 | Shieh ................................ 704/4 |
| 7,310,646 | B2 | 12/2007 | Rangadass et al. |
| 7,552,385 | B2 | 6/2009 | Kreulen et al. |
| 7,672,830 | B2 | 3/2010 | Goutte et al. |
| 7,673,282 | B2 | 3/2010 | Amaru et al. |
| 2002/0165884 | A1* | 11/2002 | Kreulen et al. ............... 707/532 |
| 2006/0048126 | A1 | 3/2006 | Sun |
| 2006/0190241 | A1* | 8/2006 | Goutte et al. ..................... 704/2 |
| 2007/0033218 | A1 | 2/2007 | Taylor |
| 2007/0282811 | A1* | 12/2007 | Musgrove ........................ 707/3 |
| 2009/0125498 | A1 | 5/2009 | Cao et al. |
| 2010/0049705 | A1 | 2/2010 | Ochi et al. |

OTHER PUBLICATIONS

Zhang et al. "Concept integration of document databases using different indexing languages" Science Direct: Information Processing and Managment vol. 42. pp. 121-135, 2006.*

(Continued)

*Primary Examiner* — Yuk Ting Choi
(74) *Attorney, Agent, or Firm* — Ryan, Mason & Lewis, LLP

(57) ABSTRACT

Techniques are disclosed for bridging terminology differences between at least two subject areas. By way of example, a computer-implemented method includes executing the following steps on a computer. A first affinity measure is computed between a first term in a first corpus, corresponding to a first subject area, and a bridge term. A second affinity measure is computed between a second term in a second corpus, corresponding to a second subject area, and the bridge term. A third affinity measure is computed between the first term and the second term based on the first affinity measure and the second affinity measure. The bridge term is a term that appears in both the first corpus and the second corpus.

19 Claims, 7 Drawing Sheets

(56) References Cited

OTHER PUBLICATIONS

C.Y. Ng et al., "Efficient Algorithms for Concept Space Construction," Proceedings of the 5th Pacific-Asia Conference on Knowledge Discovery and Data Mining, Lecture Notes in Computer Science (LNCS), Jan. 2001, pp. 90-101, vol. 2035.

L. Chen et al., "Increasing the Customer's Choice: Query Expansion Based on the Layer-Seeds Method and its Application in E-Commerce," Proceedings of the IEEE International Conference on E-Technology, E-Commerce and E-Service (EEE), Mar. 2004, pp. 317-324.

Xueying Zhang, "Concept Integration of Document Databases Using Different Indexing Languages," Science Direct, Information Processing & Management, 2006, pp. 121-135, vol. 42.

\* cited by examiner

1. Process each input corpus:

a) Compute <u>Glossary</u> G and index to documents b) Compute <u>Affinity Matrix</u> A between pairs of terms in G and assign scores according to <u>Similarity Measure</u> c) Compute <u>Transitive Closure</u> A* of affinity matrix A and assign score for a pair of terms in A* by <u>Composite Path Probability</u>

2. Compute the set of <u>Bridge Terms</u> B by intersecting the glossaries of two corpora F and T 3. Compute Synonym Dictionary as a set of triples S(f,t,w) where f is a term in glossary $G_F$ of corpus F, t is a term in glossary $G_T$ of corpus T, and there exists a term b in Bridge Terms B such that the term triple (f,b,t) is in join of $A^*_F$. B. $A^*_T$ and where w is the Composite Path Probability of (f,b,t)

FIG. 1

The degree of similarity between the two terms *b* and *t* is based on the probability of occurrence of each term *P(b)* and *P(t)* and probability of their co-occurrence *P(b,t)*

- Mutual Information:

$$MI(b,t) = P(b,t) \log \frac{P(b,t)}{P(b)P(t)} \quad \leftarrow 31$$

- Jaccard Coefficient:

$$Jac(\vec{b},\vec{t}) = \frac{\vec{b} \cap \vec{t}}{\vec{b} \cup \vec{t}} = \frac{freq(b,t)}{freq(b) + freq(t) - freq(b,t)} \quad \leftarrow 32$$

FIG. 3

Path probability for a path between two terms $t_1$ and $t_k$
- $P(t_1, t_k) = w(t_1,t_2) * w(t_2,t_3) * \ldots * w(t_{k-1}, t_k)$ ◄— 41

Sum of path probabilities, if there are n paths from $t_1$ to $t_k$ $$\sum_{i=1}^{n} P_i(t_1, t_k)$$ ◄— 42

FIG. 4

INFORMATION EXTRACTION ACROSS MULTIPLE EXPERTISE-SPECIFIC SUBJECT AREAS

CROSS-REFERENCE TO RELATED APPLICATION

This application is a Continuation of U.S. patent application Ser. No. 12/329,804, filed on Dec. 8, 2008, which is fully incorporated herein by reference.

FIELD OF THE INVENTION

The present invention relates to information processing and, more particularly, to information extraction and analysis from unstructured text documents.

BACKGROUND OF THE INVENTION

Many large entities such as corporations have vast and growing collections of assets to apply against opportunities. Examples of such assets include sales collateral, customer case studies, prior request for proposal (RFP) responses, manuals and documentation of a company's own products and its partners' products. But these assets are fragmented across expertise boundaries, for example: (i) between sales and marketing people and technologists; (ii) many product lines, each with its team of experts; and (iii) multiple disciplines (e.g., physics and computer science).

Experts know their individual area of expertise but have limited perception of other areas that could apply against customer opportunities. Moreover, there exist relatively few experts relative to the size of a company's workforce and opportunity pipeline. The basic problem is that vocabulary from one subject area is different from other subject areas. Consequently, an expert from one area rarely can articulate precise terms to retrieve relevant information from another subject area.

From a technical perspective, there exist techniques in query augmentation, information retrieval and thesaurus construction that globally analyze a given corpus, but these techniques do not address vocabulary mismatches across multiple subject areas.

From a business value perspective, such a vocabulary mismatch between subject areas results in sub-optimal utilization of a company's assets against opportunities in sales, RFP response preparation, etc. Such a vocabulary mismatch also results in unnecessary expense in re-doing a task while similar capability exists in other areas.

SUMMARY OF THE INVENTION

Embodiments of the invention provide techniques for bridging terminology differences between at least two subject areas.

By way of example, in one embodiment, a computer-implemented method comprises executing the following steps on a computer. A first affinity measure is computed between a first term in a first corpus, corresponding to a first subject area, and a bridge term. A second affinity measure is computed between a second term in a second corpus, corresponding to a second subject area, and the bridge term. A third affinity measure is computed between the first term and the second term based on the first affinity measure and the second affinity measure. The bridge term is a term that appears in both the first corpus and the second corpus.

The method may also comprise generating an output data structure indexed by the first term and the second term. The bridge term may be selected by a user. The bridge term may alternatively be selected in view of a statistical analysis performed on the first corpus and the second corpus. The first corpus and the second corpus may be unstructured text documents. Also, each of the first affinity measure and the second affinity measure may represent affinity between pairs of terms in its corresponding corpus.

Further, the above-described method may be employed such that a query comprising the first term of the first corpus is augmented by adding to the query: (i) the bridge term; and (ii) the second term of the second corpus.

In another embodiment, a computer-implemented method for bridging terminology differences between at least two subject areas comprises executing the following steps on a computer. A first corpus associated with a first subject area is obtained, and a second corpus associated with a second subject area is obtained. For each obtained corpus, the following steps are performed: compute a glossary; compute an affinity matrix between pairs of terms in the glossary and assign scores according to a similarity measure; and compute a transitive closure of the affinity matrix and assign a score for a pair of terms in the transitive closure of the affinity matrix using a composite path probability. A set of bridge terms is computed by intersecting the respective glossaries of the first corpus and the second corpus. A synonym dictionary is computed as a set of triples $S(f, t, w)$ where f is a team in the glossary of the first corpus, t is a term in the glossary of the second corpus, and there exists a term b in the set of bridge terms such that a term triple $(f, b, t)$ is in a join of the transitive closure of the affinity matrix of the first corpus, the set of bridge terms, and the transitive closure of the affinity matrix of the second corpus, and where w is the composite path probability of $(f,b,t)$.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 1 illustrates a methodology for bridging terminology differences between at least two subject areas, according to an embodiment of the invention.

FIG. 3 illustrates similarity measures for determining the strength of affinity between two terms within a subject area, according to an embodiment of the invention.

FIG. 4 illustrates how to compose similarity measures for determining the strength of affinity between two terms which are transitively or indirectly related within a corpus associated with a subject area, or across corpora from different subject areas according to an embodiment of the invention.

DETAILED DESCRIPTION OF PREFERRED EMBODIMENTS

Figure 2:
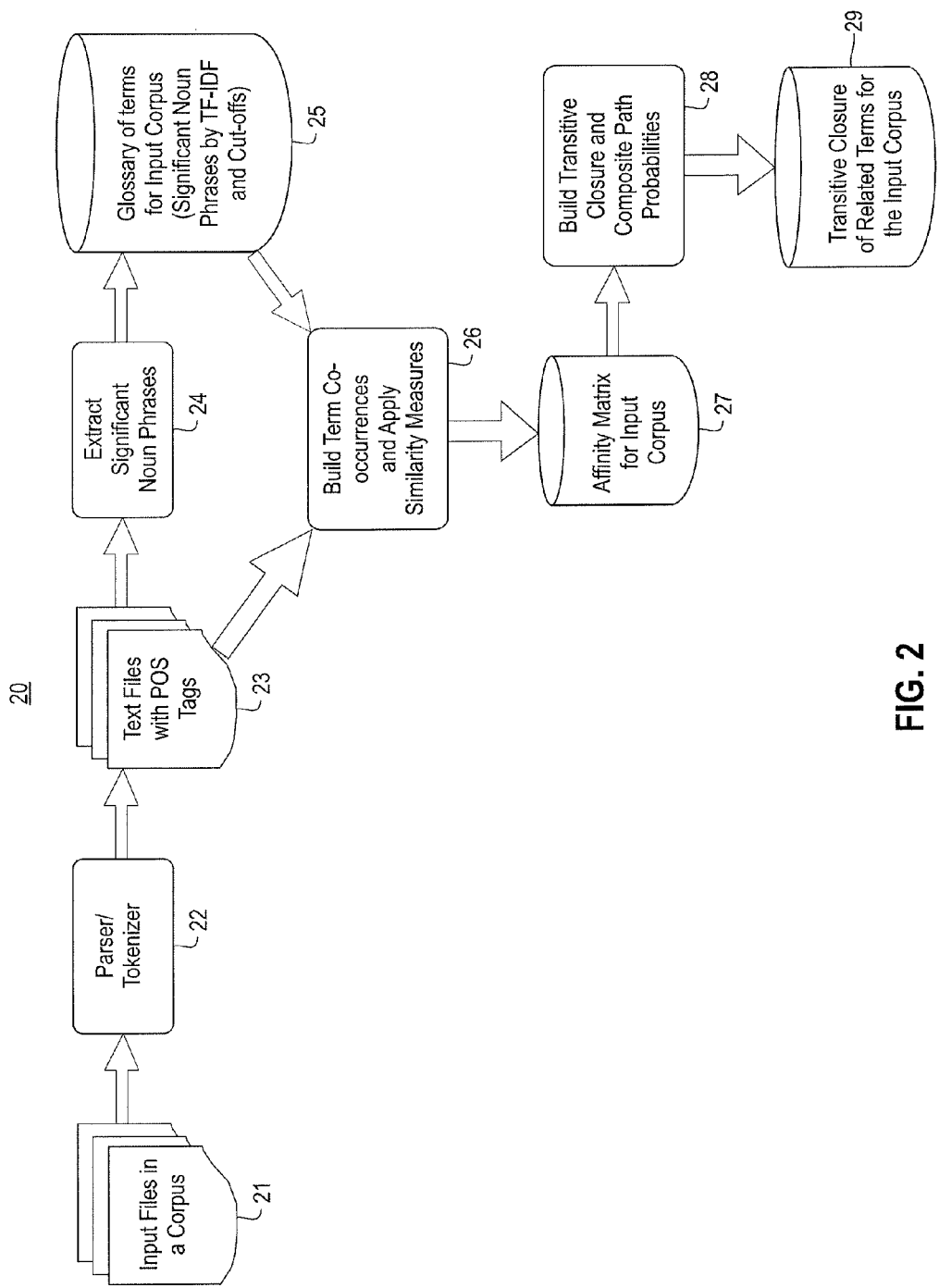
FIG. 2 illustrates a methodology for processing a corpus (a collection of documents) associated with a subject area, according to an embodiment of the invention.

Illustrative embodiments of the invention will be described herein in the context of an illustrative enterprise (e.g., corporate or company) environment. However, it is to be understood that principles of the invention are more generally applicable to any environment wherein it would be desirable to employ techniques for bridging terminological differences (gaps) between different subject areas.

Illustrative embodiments of the invention provide techniques for bridging terminological gaps between different subject areas. As will be explained below, in a preferred illustrative embodiment, a technique comprises discovering and collecting the relationships between terms in a cross-subject thesaurus called a synonym dictionary. Principles of the invention also provide a query augmentation system where query terms from one subject area are augmented with terms from the other subject area using the synonym dictionary. One of many advantages of the techniques and systems of the invention is that information extraction is successfully enabled across subject areas using one or more such synonym dictionaries.

FIG. 1 illustrates a methodology for bridging terminology differences between at least two subject areas, according to an embodiment of the invention. The overall algorithm 10 shown in FIG. 1 computes a cross-subject thesaurus or synonym dictionary for two or more term corpora associated with two or more different subject areas. In this example, a first corpus is a corpus F associated with functional expertise subject area in some enterprise, and a second corpus is a corpus T associated with technical expertise subject area in the same enterprise. Of course, it is to be understood that the invention is not limited to situations wherein the different subject areas are associated with the same enterprise. Also, the illustration is for two different corpora; however, more than two corpora may be bridged in accordance with the invention.

Starting in step 1 of algorithm 10, each individual input corpus is processed in accordance with steps 1(a), 1(b), and 1(c). A general description will be given of each sub-step followed by a more detailed description.

Step 1(a) computes a glossary G (e.g., of significant noun phrases) for the given corpus taken from a set of documents from the given corpus. An index to the documents is also created such that it is known from which document(s) each term in the glossary came.

Step 1(b) computes an affinity measure (described in detail in FIG. 3) which captures the direct relationship between pairs of terms taken from the glossary G for the given corpus. Two terms are deemed to be related if they appear in some unit of documents with sufficient statistical significance. The affinity measure computed in step 1(b) scores the degree of relatedness via a similarity measure. The result of step 1(b) for a given corpus is a two-dimensional matrix indexed by the terms of the glossary. A cell indexed by term t1 and t2 has a non-zero value if the terms t1 and t2 are related (i.e., they co-occur in some document units with sufficient statistical significance) and the value in the cell is the strength of relatedness between the said two terms in a given corpus.

Step 1(c) extends the basic direct relationships by the transitive relationships between pairs of terms which are only indirectly related. Scores for transitive relationships are calculated by composite path probabilities (described in detail in FIG. 4).

Note that the above-describe sub-steps of step 1 are repeated for each corpus to be bridged.

FIG. 2 describes the corpus processing methodology in further detail. As shown, in methodology 20, files of a corpus are input (21) to the system. Such files, which constitute a corpus, are preferably unstructured text documents in various formats. The files are passed through a parser/tokenizer (22) where the text of each file is parsed and tagged based on the part of speech (POS) that the text is found to be (e.g., noun, verb, etc.). This parsing/tokenizing step results in text file with POS tags (23).

Significant noun phrases are extracted (24) from the POS-tagged text files. For each noun phrase, a TF-IDF (term frequency-inverse document frequency) value is computed which is a known statistical measure indicating the relative importance of a phrase within a corpus. Significant nouns are identified as those whose TF-IDF value lies within high and low thresholds (cut-offs). In the present embodiment, the cut-offs are numbers chosen as configuration parameters according to size of a given corpus and the total number of noun phrases. These significant nouns are stored (25) as the glossary G for the input corpus. Thus, a glossary is a data structure such as a table of significant noun phrases and an index to the documents where the phrase has occurred. A term is a phrase in a glossary.

A similarity measure between a pair of terms in the input corpus is computed on the basis of probabilities of individual occurrences and joint co-occurrences in some unit of a document. Document units are inclusive of sentences, paragraphs and the whole document. Such co-occurrences of terms are determined from the POS-tagged documents, and a similarity measure is then applied (26).

Typical similarity measures that can be used are shown by the formulae 30 in FIG. 3. That is, the degree of similarity between two terms b and t is based on the probability of occurrence of each teem P(b) and P(t) and the probability of their co-occurrence P(b,t). Measures that can capture such relatedness are the mutual information measure (formula 31) or the Jaccard coefficient measure (formula 32).

Returning to FIG. 2, application of the similarity measure (26) yields an affinity matrix for the input corpus (27). Recall that this corresponds to step 1(b) in FIG. 1. An affinity matrix is a data structure such as a table of pairs of terms and a score for the pair where two terms in a pair have co-occurred in some unit of the document and the score is assigned by a similarity measure.

The information contained in an affinity matrix can be interpreted also as a term relationship graph where a term in the glossary denotes a vertex in the graph and each non-zero value w in the cell of an affinity matrix indexed by two terms t1 and t2 denotes an edge from a vertex t1 to a vertex t2 with the weight of the edge being w. In the relationship graph, two terms are directly related if there is an edge between them and are indirectly related if there is a path in the relationship graph between these terms. Transitive closure of the affinity matrix (equivalent of term relationship graph) is computed in step 1(c) of FIG. 1 and is depicted in FIG. 2 at blocks 28 and 29. Transitive closure is intended to capture the relationship between a pair of terms which are not directly related in the affinity matrix, but are related indirectly via some interrelated intermediate terms in the affinity matrix. For a pair of terms in the transitive closure, the degree of relatedness is preferably computed according to composite path probability measures shown in FIG. 4.

As depicted in the formulae 40 of FIG. 4, a path probability for a path in a relationship graph between two terms t1 and t2 is given by formula 41. The sum of the path probabilities for n paths between terms t1 and t2 is given by formula 42. These measures capture two intuitions. The first intuition is that the vertices that are reachable in a lesser number of hops are more closely related. The second intuition is that the vertices that can be reached via many distinct paths are more closely related.

Now that each corpus is processed as explained above in the context of FIGS. 2 through 4, the description returns to step 2 of FIG. 1. In step 2, the bridging algorithm 10 computes the set of bridge terms B by intersecting the glossaries of two corpora F and T. Recall that a bridge term is one which appears in both corpora. Hence, taking the set-intersection of the sets of terms from the two glossaries for both corpora computes the set of bridge terms.

In step 3 of FIG. 1, the reachability across corpora is computed. From a term f in a corpus F, a term t in corpus T is reachable, if there exists some path from f to a bridge term b in the affinity matrix of corpus F and there exists some path in the affinity matrix of corpus T from the same bridge term b to the term t. Such cross-corpora reachability can be computed by joining the transitive closures of the affinity matrices of the corpora with the bridge terms table. The composite score for the degree of relatedness between terms across two corpora are computed also by the composite path probability shown in FIG. 4. Step 3 in FIG. 1 summarizes these operations that result in a cross-subject synonym dictionary.

Thus, given the above illustrations, a method for bridging terminology differences between at least two subject areas may be generally described as follows. A first affinity measures between pairs of terms in a first corpus, corresponding to a first subject area. By way of example, this may represent the computations in step 1 of FIG. 1. Note that since bridge terms are included in the glossary of a corpus, the affinity matrix for the corpus also includes the relationships between non-bridge terms and bridge terms, as well as between bridge terms themselves. Likewise, a second affinity measures between the pairs of terms in a second corpus, corresponding to a second subject area. Again, this may represent the computations in step 1 of FIG. 1. Then, a third affinity measure between a first term from a first corpus and the second term in a second corpus is computed based on the first affinity measure and the second affinity measure provided the first term and second term are related either directly (in the affinity matrix) or indirectly (in the transitive closures thereof) via one or more bridge terms. This may represent steps 2 and 3 of FIG. 1.

Figure 5:
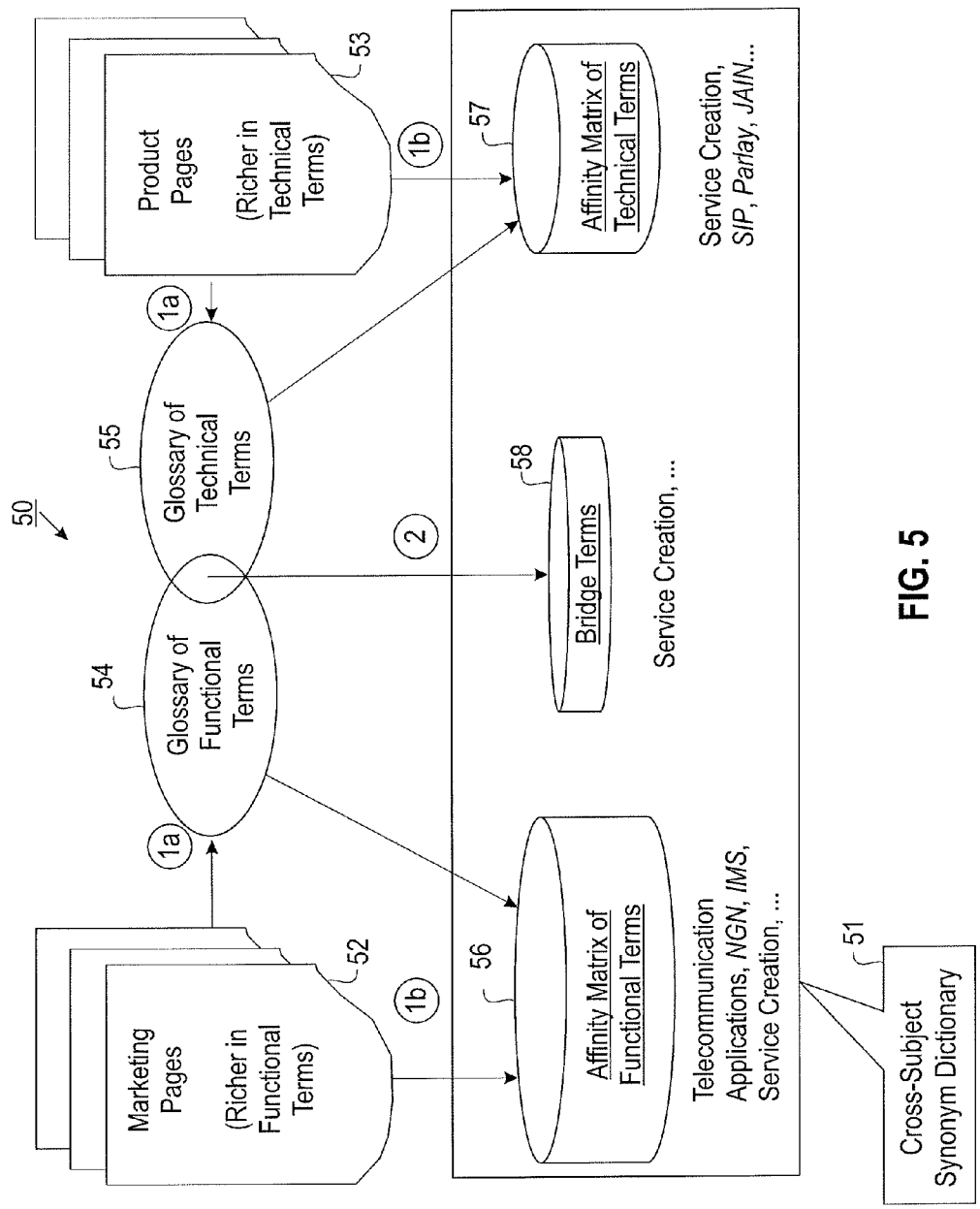
FIG. 5 illustrates a system for constructing a cross-subject synonym dictionary for a functional expertise subject area and a technical expertise subject area, according to an embodiment of the invention.
Figure 6:
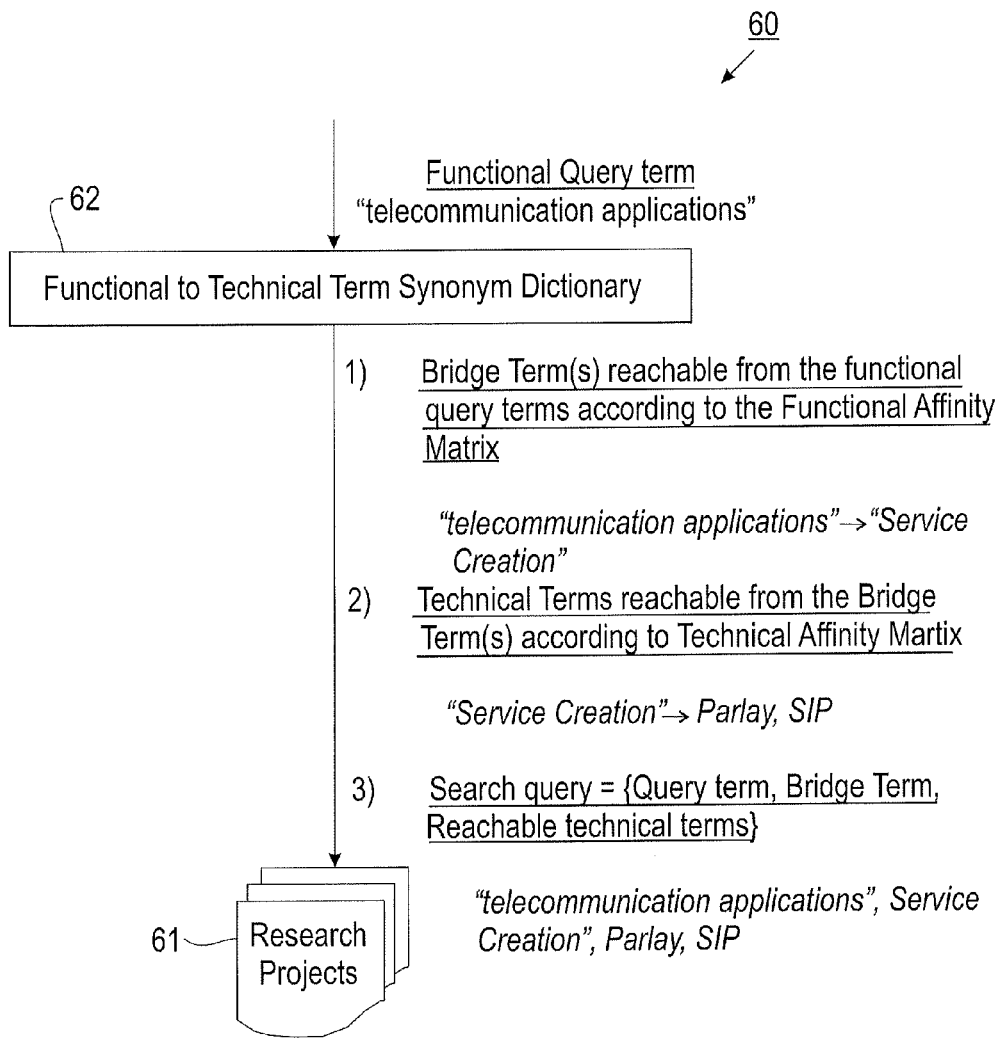
FIG. 6 illustrates a query augmentation methodology using a cross-subject synonym dictionary, according to an embodiment of the invention.

An illustration is now given, via an example outlined in FIGS. 5 and 6, of how the information collected by the algorithm of FIG. 1 can be used to help a search user, proficient in one subject area, to formulate precise searches in an unfamiliar domain.

Consider a sales professional familiar with functional terms in a telecommunication industry, who does not know in depth the technologies used to implement the functionalities and wants to find which research projects may be useful for a functional area (e.g., "telecommunication applications").

As shown in FIG. 5, a cross-corpus synonym dictionary 51 linking functional terms with technology terms can be purpose-built by taking a corpus with marketing literature 52 from vendors in telecommunication industry and a corpus with product literature 53 from the same vendors. These two corpora fed as input to the algorithm of FIG. 1 can create the required synonym dictionary.

As illustrated in FIG. 5, the affinity matrix 56 for marketing literature will show the related functional terms as application areas in telecommunication industry. Likewise, the affinity matrix 57 for the product literature will contain related technical terms. The bridge terms 58 will be the intersection of the glossaries of marketing literature (54) and of technical literature (55), respectively. Typically, general functional terms and general technical terms will be bridge terms, but more detailed terms of either category will be in only their respective glossaries and affinity matrices. For example, as illustrated in FIG. 5, the usage terms "telecommunication applications" and "service creation" are functional terms and "service creation," "SIP," "Parlay," and "JAIN" are technical terms. Of these, "service creation" is a bridge term, by virtue of appearing in both corpora.

Referring to methodology 60 in FIG. 6, when a sales professional needs to find relevant research projects 61 in his/her organization that addresses "telecommunication applications," the cross-subject synonym dictionary 62 linking functional terms and technical terms can be used to augment the input query term "telecommunication applications" as follows:

The functional term pair "telecommunication applications" and "service creation" will be found in the transitive closure of the corpus for marketing literature.

The technical terms related to the bridge term "service creation" will be found in the transitive closure of the corpus for technical literature.

So the original query for "telecommunication applications" will be augmented with related technical terms "SIP," "Parlay," and "JAIN."

The augmented query "telecommunication application," "service creation," "SIP," "Parlay," and "JAIN" is then used to search the collection of research projects.

In other words, the sales professional will be able to find relevant research projects related with "SIP," "Parlay," and "JAIN" without knowing these technology terms a priori.

Recall that query augmentation depends on computation of transitive closures. In one embodiment, the entire set of transitive closures can be pre-computed prior to receipt of the query. In another embodiment, particular transitive closures can be interactively computed when specific terms are contained in the received query.

There are many advantages to the above-described principles of the invention. One main advantage is the ability to discover and collect affinities between terms across multiple expertise-specific subject areas. The synonym dictionary is query independent in the sense that, once constructed, it can be used for any cross-corpus query and the discovered affinities are collected. Further, synonym dictionary construction is unsupervised without human intervention. Dictionary construction performs well even with a noisy corpus found by an imperfect crawl across various web sites to discover (i.e., learn) different corpora. Dictionary construction is also strictly content dependent, not dependent on collective user behavior such as page ranking or social tagging. This is significant for a desktop or an intra-company search where statistically significant collective user behavior per document may not be available. Query augmentation with cross-subject synonym dictionary improves recall, as well as precision, by using weights of augmented query terms.

Figure 7:
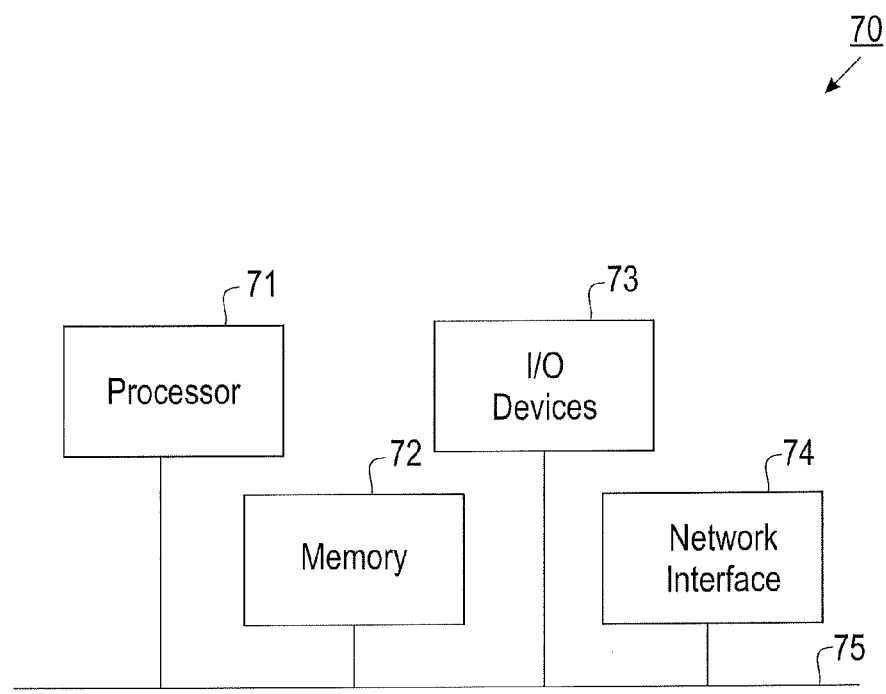
FIG. 7 illustrates a computing system in accordance with which one or more components/methodologies of the invention may be implemented according to an embodiment of the present invention.

Referring lastly to FIG. 7, an exemplary implementation 70 of a computing system in accordance with which one or more components/methodologies of the invention (e.g., components/methodologies described in the context of FIGS. 1-6) may be implemented is depicted, according to an embodiment of the present invention. For example, the exemplary implementation may represent the computing system used to perform methodologies 10, 20, 30, 40, 50, and 60 described above.

As shown, the methodologies described herein may be implemented in accordance with a processor 71, a memory 72, I/O devices 73, and a network interface 74, coupled via a computer bus 75 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. It is understood that a memory device mentioned here is an example of "computer readable storage medium," which may constitute an article of manufacture when software instructions or code for implementing techniques of the invention are stored for execution thereon by a processor of a computer.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Thus, as mentioned above, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A computer-implemented method for bridging terminology differences between at least two subject areas, comprising executing the following steps on a computer:

computing a first affinity measure between a first term in a first corpus, corresponding to a first subject area, and a bridge term;

computing a second affinity measure between a second term in a second corpus, corresponding to a second subject area, and the bridge term;

computing a third affinity measure between the first term and the second term based on the first affinity measure and the second affinity measure; wherein the bridge term is a term that appears in both the first corpus and the second corpus, wherein computing at least one of the first affinity measure and the second affinity measure comprises computing a transitive closure of an affinity matrix of at least one of the first corpus and the second corpus;

assigning a score for a pair of terms in the transitive closure of the affinity matrix using a composite path probability, wherein the composite path probability is a computation of a sum of path probabilities for n paths between the pair of terms, wherein n is an integer greater than 0.

2. The method of claim 1, further comprising the step of generating an output data structure indexed by the first term and the second term.

3. The method of claim 1, wherein the bridge term is selected by a user.

4. The method of claim 1, wherein the bridge term is selected in view of a statistical analysis performed on the first corpus and the second corpus.

5. The method of claim 1, wherein the first corpus and the second corpus are unstructured text documents.

6. The method of claim 1, wherein each of the first affinity measure and the second affinity measure represents affinity between pairs of terms in its corresponding corpus.

7. The method of claim 1, further comprising augmenting a query comprising the first term of the first corpus by adding to the query: (i) the bridge term; and (ii) the second term of the second corpus.

8. The method of claim 1, wherein the first term is not in the second corpus.

9. The method of claim 8, wherein the second term is not in the first corpus.

10. The method of claim 1, wherein the third affinity measure comprises a composite path probability of the first term, the bridge term, and the second term.

11. Apparatus for bridging terminology differences between at least two subject areas, comprising: a memory; and a processor coupled to the memory and configured to:

compute a first affinity measure between a first term in a first corpus, corresponding to a first subject area, and a bridge term;

compute a second affinity measure between a second term in a second corpus, corresponding to a second subject area, and the bridge term; and compute a third affinity measure between the first term and the second term based on the first affinity measure and the second affinity measure; wherein the bridge term is a term that appears in both the first corpus and the second corpus, and wherein when computing at least one of the first affinity measure and the second affinity measure the processor is further configured to compute a transitive closure of an affinity matrix of at least one of the first corpus and the second corpus;

assign a score for a pair of terms in the transitive closure of the affinity matrix using a composite path probability, wherein the composite path probability is a computation of a sum of path probabilities for n paths between the pair of terms, wherein n is an integer greater than 0.

12. The apparatus of claim 11, wherein the processor is further configured to generate an output data structure indexed by the first term and the second term.

13. The apparatus of claim 11, wherein the bridge term is selected by a user.

14. The apparatus of claim 11, wherein each of the first affinity measure and the second affinity measure represents affinity between pairs of terms in its corresponding corpus.

15. The apparatus of claim 11, wherein the processor is further configured to augment a query comprising the first term of the first corpus by adding to the query: (i) the bridge term; and (ii) the second term of the second corpus.

16. An article of manufacture for bridging terminology differences between at least two subject areas, comprising a non-transitory computer readable storage medium including one or more computer programs that when executed by a computer perform the steps of:
- computing a first affinity measure between a first term in a first corpus, corresponding to a first subject area, and a bridge term;
- computing a second affinity measure between a second term in a second corpus, corresponding to a second subject area, and the bridge term; and
- computing a third affinity measure between the first term and the second term based on the first affinity measure and the second affinity measure;

wherein the bridge term is a term that appears in both the first corpus and the second corpus, and wherein computing at least one of the first affinity measure and the second affinity measure comprises computing a transitive closure of an affinity matrix of at least one of the first corpus and the second corpus; and
- assigning a score for a pair of terms in the transitive closure of the affinity matrix using a composite path probability, wherein the composite path probability is a computation of a sum of path probabilities for n paths between the pair of terms, wherein n is an integer greater than 0.

17. The article of claim 16, further comprising the step of generating an output data structure indexed by the first term and the second term.

18. The article of claim 16, wherein the bridge term is selected by a user.

19. The article of claim 16, further comprising augmenting a query comprising the first term of the first corpus by adding to the query: (i) the bridge term; and (ii) the second term of the second corpus.

* * * * *